(12) United States Patent  
Gage

(10) Patent No.: US 9,845,623 B1  
(45) Date of Patent: Dec. 19, 2017

(54) TOUCH CONTROL OF VEHICLE DOOR LOCKS

(71) Applicant: Toyota Motor Engineering & Manufacturing North America, Inc., Erlanger, KY (US)

(72) Inventor: Sergei I. Gage, Redord, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/185,339

(22) Filed: Jun. 17, 2016

(51) Int. Cl.
| | |
|---|---|
| G05B 19/00 | (2006.01) |
| G04B 17/00 | (2006.01) |
| E05B 81/76 | (2014.01) |
| E05B 81/16 | (2014.01) |
| E05B 81/72 | (2014.01) |
| B60R 25/24 | (2013.01) |

(52) U.S. Cl.
CPC .............. *E05B 81/76* (2013.01); *B60R 25/24* (2013.01); *E05B 81/16* (2013.01); *E05B 81/72* (2013.01)

(58) Field of Classification Search
CPC . E05B 81/78; G07C 9/00309; G07C 2209/65; B60J 5/04
USPC ...... 340/5.72, 5.62, 426.36; 296/146.4, 216; 70/237, 49, 502, 278.1, 266, 344
See application file for complete search history.

(56) References Cited

U.S. PATENT DOCUMENTS

| | | |
|---|---|---|
| 8,022,808 B2 | 9/2011 | Kurpinski et al. |
| 8,126,450 B2 | 2/2012 | Howarter et al. |
| 2003/0222759 A1* | 12/2003 | Amagasa ................ E05B 81/78 340/5.72 |
| 2006/0066439 A1* | 3/2006 | Keeling ................ B60R 25/246 340/5.61 |
| 2009/0160211 A1* | 6/2009 | Krishnan ................... B60J 5/04 296/146.4 |

(Continued)

FOREIGN PATENT DOCUMENTS

| | | |
|---|---|---|
| JP | 4913534 | 4/2012 |
| JP | 5405874 | 11/2013 |
| WO | WO2015138726 | 9/2015 |

OTHER PUBLICATIONS http://classiccars.com/articles/pr_le_resto_magictouch.aspx—"Magic Touch" (undated).

(Continued)

*Primary Examiner* — George Bugg  
*Assistant Examiner* — Munear Akki  
(74) *Attorney, Agent, or Firm* — Dinsmore & Shohl LLP

(57) ABSTRACT

A vehicle includes a vehicle door including a vehicle door handle that moves a door latch assembly between a latched configuration and an unlatched configuration. A door lock apparatus is operatively connected to the door latch assembly. An electric motor moves the door lock apparatus between a locked configuration to disallow operation of the door latch assembly using the vehicle door handle and an unlocked configuration that allows operation of the door latch assembly using the vehicle door handle. A door lock control system includes a door lock control zone that is provided on the vehicle door handle. The door lock control zone includes a touch sensor that provides a control signal to an ECU based on an operator touch. The ECU operates the electric motor based on the control signal.

17 Claims, 4 Drawing Sheets

(56) References Cited

U.S. PATENT DOCUMENTS

| | | | |
|---|---|---|---|
| 2009/0206990 A1* | 8/2009 | Nelson | B60R 25/246 |
| | | | 340/5.72 |
| 2010/0332086 A1 | 12/2010 | Zhao | |
| 2013/0002419 A1* | 1/2013 | Lee | B60Q 9/008 |
| | | | 340/457 |
| 2014/0001779 A1 | 1/2014 | Bedoian et al. | |
| 2014/0285320 A1 | 9/2014 | Blackmer et al. | |
| 2015/0077227 A1* | 3/2015 | Salter | E05B 81/76 |
| | | | 340/5.72 |
| 2016/0208537 A1* | 7/2016 | Senguttuvan | B60W 50/0098 |

OTHER PUBLICATIONS http://www.bmw.com/com/en/insights/technology/technology_guide/articles/comfort_access_system.html—"Comfort Access System" (undated).

http://www.digitaltrends.com/apple/kwikset-kevo-unlocks-the-door-with-a-single-touch/—"Kwikset Kevo Unlocks Front Door with a Single Touch" (May 14, 2013).

* cited by examiner

TOUCH CONTROL OF VEHICLE DOOR LOCKS

TECHNICAL FIELD

The present specification generally relates to control of vehicle door locks and, more specifically, to touch control of vehicle door locks.

BACKGROUND

Frequently, door lock control switches for vehicles may be located on doors of the vehicles, such as in an armrest area. Door lock control switches located on a particular door may be provided for controlling locking and unlocking of the door lock for that particular door and/or for multiple doors simultaneously. Additional switches may be provided on the driver door for controlling other vehicle components, such as vehicle windows.

The door control switches are typically manually actuated, momentary-type switches having a LOCK position, an OPEN position and an OFF position, which is a rest or return to center position where a LOCK/UNLOCK state can be maintained. These door lock control switches may be somewhat small and have correspondingly small actuation areas. Where multiple control switches are provided, an operator may have to feel for and identify the desired control switch. Additionally, it is not uncommon to place other control switches near the door lock control switches, such as window control switches.

Accordingly, a need exists for vehicles, systems and methods that facilitate control of vehicle door using touch control.

SUMMARY

In one embodiment, a vehicle includes a vehicle door including a vehicle door handle that moves a door latch assembly between a latched configuration and an unlatched configuration. A door lock apparatus is operatively connected to the door latch assembly. An electric motor moves the door lock apparatus between a locked configuration to disallow operation of the door latch assembly using the vehicle door handle and an unlocked configuration that allows operation of the door latch assembly using the vehicle door handle. A door lock control system includes a door lock control zone that is provided on the vehicle door handle. The door lock control zone includes a touch sensor that provides a control signal to an ECU based on an operator touch. The ECU operates the electric motor based on the control signal.

In another embodiment, a method of controlling a door lock apparatus of a vehicle door is provided. The method includes determining that a touch sensor is actuated by an operator touch using an ECU. The touch sensor is located in a door lock control zone that is provided on a vehicle door handle. It is determined that the touch sensor within the door lock control zone is actuated by another operator touch within a predetermined time period using the ECU. The ECU controls an electric motor that is operatively connected to the door lock apparatus based on the step of determining that the touch sensor within the door lock control zone is actuated by the another operator touch within the predetermined time period.

In yet another embodiment, a method of controlling a door lock apparatus of a vehicle door is provided. The method includes determining that a touch sensor is actuated by an operator touch using an ECU for less than a predetermined time period corresponding to a first tap. The touch sensor is located in a door lock control zone that is provided on a vehicle door handle. It is determined that the touch sensor within the door lock control zone is actuated by another operator touch for less than the predetermined time period using the ECU corresponding to a second tap. The ECU controls an electric motor that is operatively connected to the door lock apparatus based on the steps of determining that the touch sensor within the door lock control zone is actuated by the operator touch for less than the predetermined time period corresponding to the first tap and the second tap.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles, systems and methods that facilitate control of vehicle door locks. The vehicles include a door lock control system that utilizes touch sensors placed on one or more door handles that can be used to detect presence of a finger or other suitable appendage for controlling operation of the door lock. In some embodiments, the door lock control systems may be provided with the touch sensors to allow for control of the door locks from only inside of the vehicles using the touch sensors. In other embodiments, the door lock control systems may be provided with the touch sensors to allow for control of the door locks from both inside and outside of the vehicles. As one example, the door lock control systems may be used with an electronic key or key fob to allow for controlling of the door locks using the touch sensors from outside the vehicles.

Figure 1:
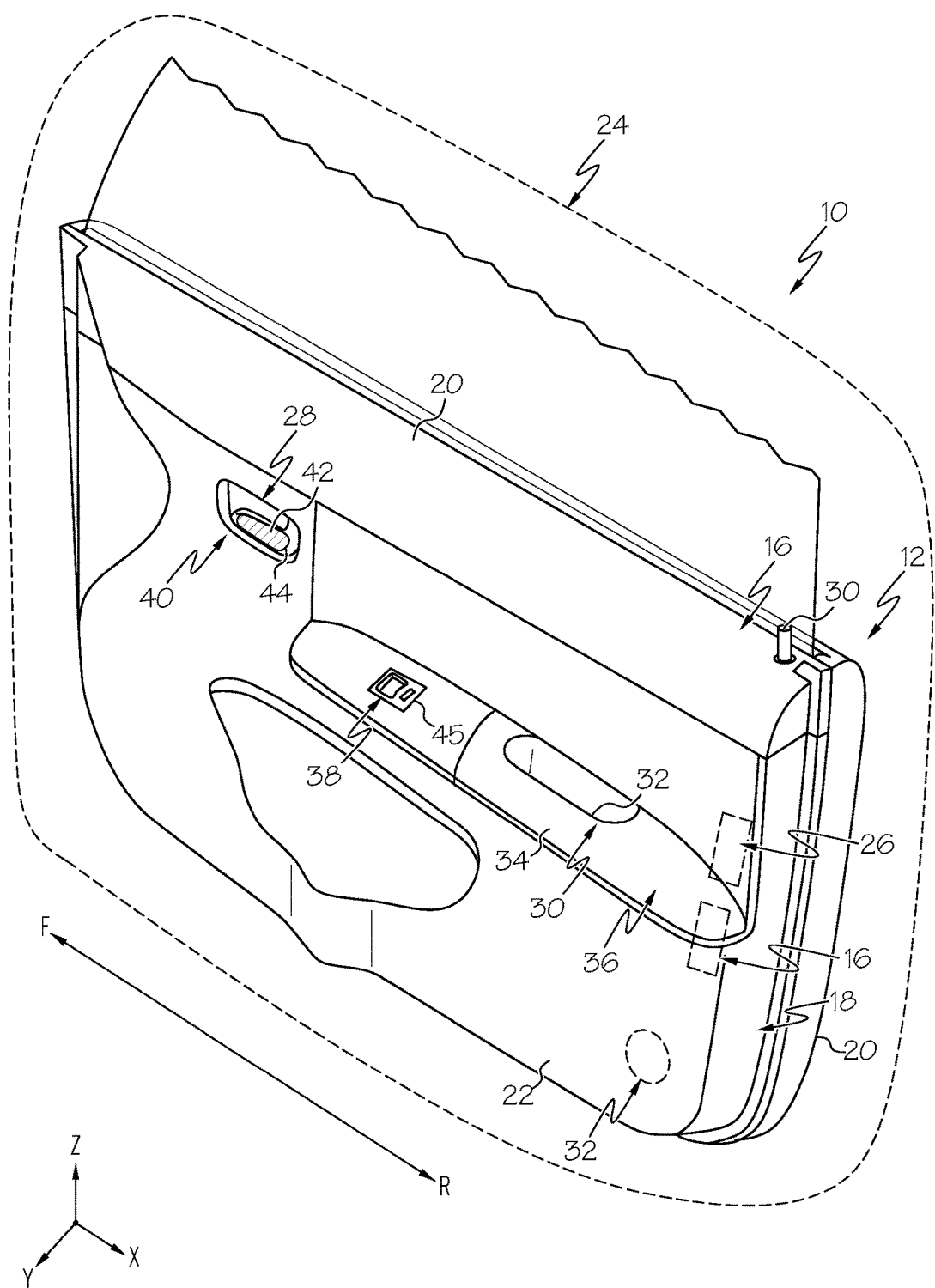
FIG. 1 is an interior view of a vehicle door of a vehicle including a door lock control zone, according to one or more embodiments shown and described herein.

Referring to FIG. 1, a vehicle 10 includes a vehicle door 12 and a door lock control assembly 14. The door lock control assembly 14 includes a door lock control system, generally referred to as element 16 that can be used to control operation of a power door lock apparatus 18 of the vehicle door 12. In the illustrated example, the vehicle door 12 may be a front driver's door; however, the door lock control assembly 14 may be equally applicable to any of the vehicle doors, including a rear door (e.g., of an SUV, van, etc.).

The vehicle door 12 may include an outer panel 20 and an inner panel 22 that is connected to the outer panel 20 to define a volume therebetween. The outer panel 20 may be an outer visible panel of a vehicle body 24, while the inner panel 22 may be an interior door trim panel that is visible from inside the vehicle 10. A door latch assembly 26 may be located at least partially within the volume between the outer panel 20 and the inner panel 22 of the vehicle door 12. The door latch assembly 26 may be operatively coupled to a vehicle door handle 28 that can be used to move the door latch assembly 26 between unlatched and latched configurations for opening and closing the vehicle door 12 against the vehicle body 24. The door latch assembly 26 may be moved from the latched to the unlatched configuration by manually tugging on the vehicle door handle 28, which may be biased toward the latched configuration.

The door lock apparatus 18 may be linked to the door latch assembly 26 and the vehicle door handle 28. The door lock apparatus 18 can be used to disengage the vehicle door handle 28 from the door latch assembly 26 in a locked configuration, to disallow unlatching of the door latch assembly 26 using the vehicle door handle 28. The door lock apparatus 18 may be operated a variety of ways. For example, the door lock apparatus 18 may be operated using a door lock pin 30 that extends outwardly from the inner panel 22. An actuator 32 (e.g., a motor) may be used to operate the door lock apparatus 18 upon user command, as will be described in greater detail below.

The inner panel 22 may further include an armrest 34 that extends into a cabin 36 of the vehicle 10. The armrest 34 may include a handle portion 36 that is provided by an opening 32 that extends into the armrest 34 in a vehicle vertical direction (+/−z). The handle portion 30 can facilitate grasping of the armrest 34 to facilitate opening and closing of the vehicle door 12. Located forward of the armrest 34 in a vehicle longitudinal direction (+/−x) is the inner vehicle door handle 28. The vehicle door 12 can be unlatched and opened using the vehicle door handle 28, as described above. Located on the armrest 34 between the vehicle door handle 28 and the handle portion 36 may be a switch mount assembly 38. The switch mount assembly 38 may include any number of switches 45 (e.g., momentary switches) that can be moved or toggled between various positions depending on the type of switch. For example, a window control switch may be moved between UP, DOWN and OFF positions. A door lock switch may be moved between LOCK and UNLOCK positions. The door lock switch may be used to activate the actuator 32 to move the door lock apparatus 18 between the lock and unlock configurations. A window lock switch may be provided that can allow the operator to lock movement of passenger windows.

The door lock control system 16 includes a door lock control zone 40. In the illustrated embodiment, the door lock control zone 40 is located on an inner facing surface 42 of the vehicle door handle 28. While a single door lock control zone 40 is illustrated, there may be multiple door lock control zones on the vehicle door handle 28 or located elsewhere, such as on the inner panel 22. The door lock control zone 40 may provide a control signal based on occupant touch within the door lock control zone 40 on the vehicle door handle 28. The door lock control zone 40 may be provided with one or more touch sensors (represented by hatch lines 44) that can be activated by the occupant by touch within the door lock control zone 40 from within the vehicle 10 which, in turn, sends a control signal to an electronic control unit (ECU) for a door lock control operation. For example, a body controller may be used to control the actuator 32 to move the door lock apparatus 18 between lock and unlock configurations.

In the illustrated example, the door lock control zone 40 is provided on the inner facing surface 42 of the vehicle door handle 28 and provides an occupant touch area for controlling operation of the door lock apparatus 18. The door lock control zone 40 may encompass an area of the inner facing surface 42, such as at least about 10 percent, such as at least about 20 percent, such as at least about 30 percent, such as at least about 40 percent, such as at least about 50 percent, such as at least about 60 percent, such as at least about 70 percent, such as at least about 80 percent of the total area of the inner facing surface 42. In some embodiments, the door lock control zone 40 may encompass the entire area of the inner facing surface 42.

Figure 2:
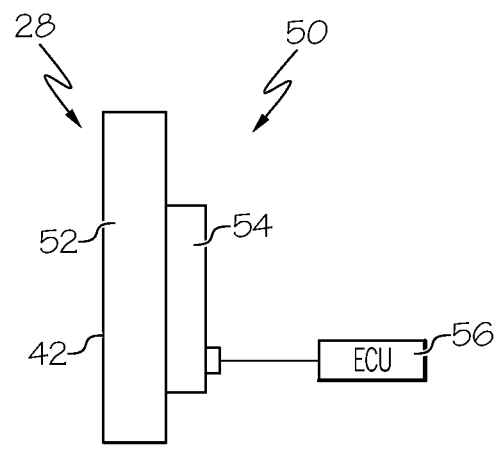
FIG. 2 is a diagrammatic view of a touch sensor for use with the door lock control zone of FIG. 1, according to one or more embodiments shown and described herein.

Any suitable touch switch technology can be used. For example, a capacitance switch can be actuated using the occupant's body capacitance. Referring briefly to FIG. 2, the capacitance switch 50 may include a non-conductive panel 52, for example, that may form the inner facing surface 42 of the vehicle door handle 28. The non-conductive panel 52 may be formed out of any suitable non-conductive material, such as plastic, glass, metal, etc. An electrode 54 may be placed adjacent the non-conductive panel 52. When the non-conductive panel is touched by the occupant, a signal may be provided to the ECU 56. In some embodiments, a piezoelectric sensor may be placed adjacent the panel 52 and function as the touch switch. While a single touch switch is illustrated by FIG. 3, multiple touch switches may be used.

Indicia may be provided to highlight the door lock control zone 40. In other embodiments, the door lock control zone 40 may not be visually detectable as it is part of the vehicle door handle 28. To accomplish this, the door lock control zone 40 may be formed of components that are part of the vehicle door handle and not readily discernible, for example, due to being located behind the inner facing surface 42 and even interior to the vehicle door handle 28, but nonetheless, can be actuated though occupant touch.

Figure 3:
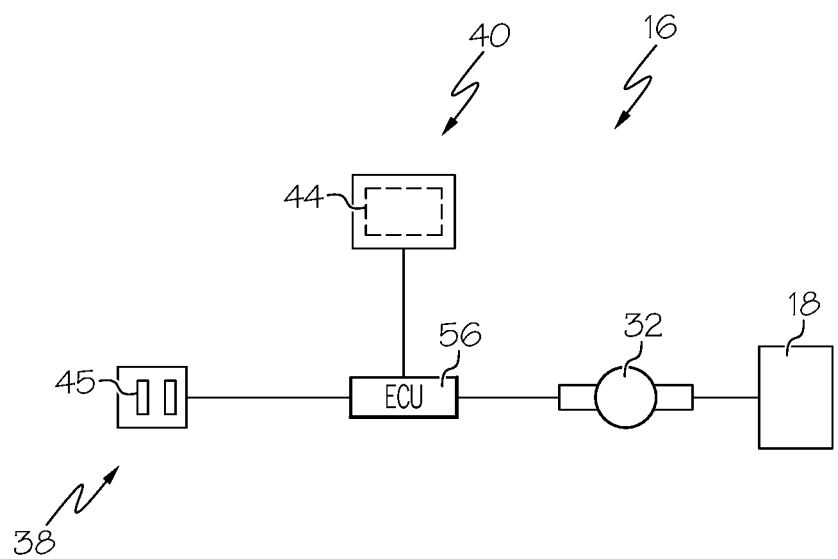
FIG. 3 is a diagrammatic view of a door lock control system for the vehicle door of FIG. 1, according to one or more embodiments shown and described herein.

FIG. 3 illustrates components of the door lock control system 16. The door lock control system 16 includes the door lock control zone 40 with touch sensor 44. The touch sensor 44 is operatively connected to the ECU 56. The switch mount assembly 38 including the switches 45 may also be connected to the ECU 56. The ECU 56 is connected to the actuator 32, which, in turn, actuates the door lock apparatus 18 between the locked configuration and the unlocked configuration based on the occupant touching of the touch sensor 44 defining the door lock control zone 40.

In some embodiments, the door lock control system 16 may utilize one or more preselected operator input sequences using the touch sensor 44, as opposed to a single touch of any duration. As one example, the ECU 56 may utilize logic saved in memory as machine-readable instructions that looks for multiple occupant contacts or taps with the touch sensor 44 in controlling operation of the actuator 32. In particular, the ECU 56 may require a double-tap of the touch sensor 44 within a predetermined interval before controlling operation of the actuator 32.

Figure 4:
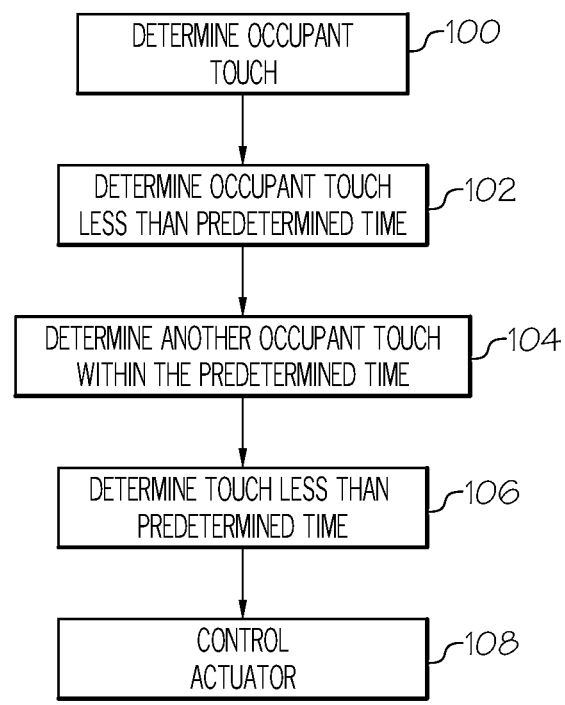
FIG. 4 is a flow diagram illustrating logic of a body ECU, according to one or more embodiments shown and described herein.

Referring to FIG. 4, a flow diagram illustrating logic for the ECU 56 controlling operation of the door lock apparatus 18 is provided based on multi-touching the touch sensor 44 within the door lock control zone 40. At step 100, it is determined that the touch sensor 44 within the door lock control zone 40 is touched by an occupant touch. At step 102, it is determined if the touch sensor 44 within the door lock control zone 40 is touched for less than a predetermined time period (e.g., at most about ¼ second) corresponding to a tap. If it is determined that the touch sensor 44 is touched or pressed for more than the predetermined time period, the occupant touch is not considered a tap and the logic returns to step 100. If, however, the touch sensor 44 is touched or pressed for less than the predetermined time period, the occupant touch is considered a tap and the logic proceeds to step 104. At step 104, it is determined whether the touch sensor 44 of the door lock control zone 40 is touched within another predetermined time period (e.g., at most about ½ second). If the touch sensor 44 is not touched within the predetermined time period, the logic returns to step 100. If the touch sensor 44 is touched within the predetermined time period, it is determined if the touch sensor 44 within the door lock control zone 40 is touched for less than a predetermined time period (e.g., at most about ¼ second) corresponding to a tap at step 106. If it is determined that the touch sensor 44 is touched for more than the predetermined time period, the occupant touch is not considered a tap and the logic returns to step 100. If, however, the touch sensor 44 is touched or pressed for less than the predetermined time period, the occupant touch is considered a tap and the ECU 56 controls operation of the actuator 32 accordingly at step 108. In some embodiments, the ECU 56 may determine (e.g., using a switch or sensor) whether the door lock apparatus 18 is in the locked or unlocked configuration before operation of the actuator 32 (e.g., using a proximity sensor). In some embodiments, the ECU 56 may save the current state (lock or unlock) of the door lock apparatus 18 in memory and operate the actuator 32 accordingly.

Figure 5:
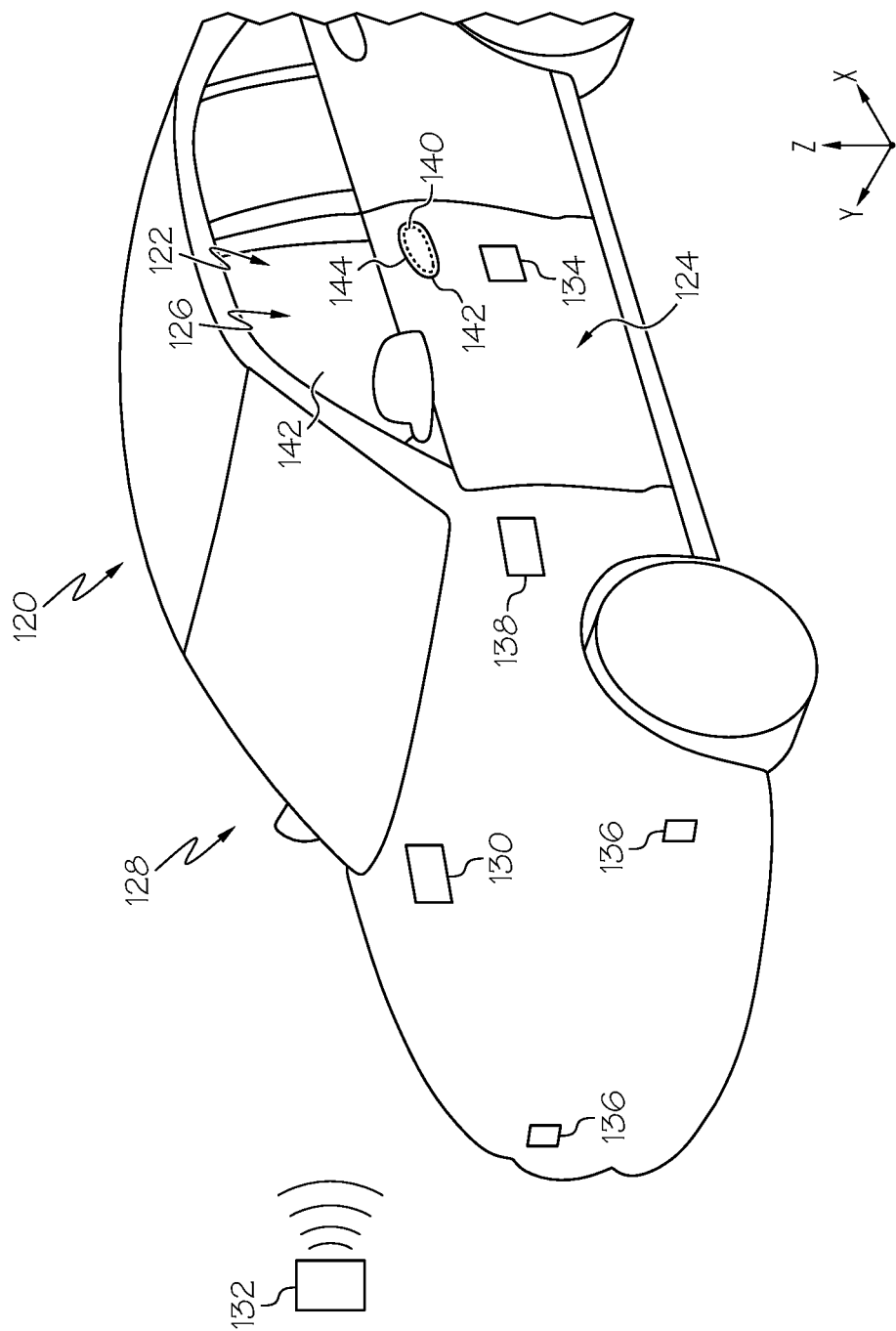
FIG. 5 illustrates a door lock control assembly that used in conjunction with a smart key-type vehicle entry system, according to one or more embodiments shown and described herein.

While the above embodiments may relate to door lock controlling operations using the door lock control zone 40 from within the vehicle, the door lock control system 16 may be used from outside the vehicle 10 in some embodiments. Referring to FIG. 5, a vehicle 120 includes a door lock control assembly 122 that is provided with a vehicle door 124 and includes a door lock control system 126. The door lock control assembly 122 may be used in conjunction with a smart key-type vehicle entry system, referred to generally as element 128.

The smart key vehicle entry system 128 may include a smart key ECU 130 that can communicate with a key fob 132 to lock and unlock a door lock apparatus 134. The key fob 132 may be a transponder that can communicate with the smart key ECU 130 via various antennas 136, which may be located at various positions on the vehicle 120. The antennas 136 may periodically send a signal in a polling fashion that causes the key fob 132 to reply with a unique security code, which is received by the smart key ECU 130 when the key fob 132 is within a predetermined range of the vehicle 120. Once the security code is received and verified by the vehicle ECU 130, the smart key ECU 130 may communicate with a body ECU 138 to activate the vehicle door lock system 126.

As discussed above, in some embodiments, a door lock control zone 140 may be provided on an exterior facing surface 142 of a vehicle door handle 144. The door lock control zone 140 may be provided on the exterior facing surface 142 of the vehicle door handle 144 to allow for touch control of a door lock apparatus 146 from outside of the vehicle 120. In this embodiment, once the smart key ECU 130 communicates the presence of the smart key fob 132 to the body ECU 138, the body ECU 138 may look for multiple operator contact (e.g., a double tap) within the door lock control zone 140 in a fashion similar to that described above.

The above-described door lock assemblies including the door lock control systems can allow occupant control of vehicle door locks by occupant touch within a door lock control zone. The door lock control zone can be part of a vehicle door handle itself and may be highlighted with indicia, or may not be visually detectable as part of the vehicle door handle. The door lock control zones can provide an increased area for door lock control compared to momentary-type switches, as the entire door lock control zone area can be provided with one or more touch sensors. The door lock control systems can be used in conjunction with other vehicle systems, such as smart key vehicle entry systems and gesture identification systems. For example, a door lock control system may only activate based on an operator input, such as a specific gesture or upon a voice command. While a capacitance touch sensor is described primarily above, other door lock control zones may be used, such as resistive touch sensors and/or piezoelectric touch sensors.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a vehicle door comprising a vehicle door handle that moves a door latch assembly between a latched configuration and an unlatched configuration;
    a door lock apparatus operatively connected to the door latch assembly;
    an electric motor that moves the door lock apparatus between a locked configuration to disallow operation of the door latch assembly using the vehicle door handle and an unlocked configuration that allows operation of the door latch assembly using the vehicle door handle; and
    a door lock control system comprising a door lock control zone that is provided on the vehicle door handle, the door lock control zone comprising a touch sensor that provides a control signal to an electronic control unit based on an operator touch, the electronic control unit operating the electric motor based on multiple operator contacts with the touch sensor within a predetermined time period to unlock the vehicle door;
    wherein the electronic control unit includes logic that controls the electric motor based on the multiple operator contacts with the touch sensor within the predetermined time period, wherein the control signal is provided if the electronic control unit determines each operator contact with the touch sensor occurs for less than the predetermined time period.

2. The vehicle of claim 1, wherein the door lock control zone is formed using a capacitive touch sensor.

3. The vehicle of claim 1, wherein the vehicle door handle is an interior vehicle door handle, the door lock control zone provided on an inner facing surface of the interior vehicle door handle.

4. The vehicle of claim 1, wherein the vehicle door handle is an exterior vehicle door handle, the door lock control zone provided on an exterior facing surface of the exterior door handle.

5. The vehicle of claim 1 further comprising a smart key vehicle entry system comprising a smart key ECU electronic control unit that receives a signal from a key fob and communicates with the ECU that controls the electric motor in response to the signal from the key fob.

6. The vehicle of claim 1, wherein the door lock control zone is a first door lock control zone and the vehicle door handle is an interior vehicle door handle, the first door lock control zone provided on an inner facing surface of the interior vehicle door handle, the vehicle further comprising a second door lock control zone and an exterior vehicle door handle, the second door lock control zone provided on an exterior facing surface of the exterior vehicle door handle.

7. A method of controlling a door lock apparatus of a vehicle door, the method comprising:
    determining that a touch sensor is actuated by an operator touch using an electronic control unit, the touch sensor being located in a door lock control zone that is provided on a vehicle door handle of the vehicle door;
    determining that the touch sensor within the door lock control zone is actuated by another operator touch within a predetermined time period using the electronic control unit, the electronic control unit determining each operator touch with the touch sensor occurs for less than the predetermined time period; and
    the electronic control unit controlling an electric motor operatively connected to the door lock apparatus based on determining that the touch sensor within the door lock control zone is actuated by the another operator touch within the predetermined time period and determining each operator touch with the touch sensor occurs for less than the predetermined time period to unlock the vehicle door.

8. The method of claim 7, wherein the vehicle door handle is an interior vehicle door handle, the door lock control zone provided on an inner facing surface of the interior vehicle door handle.

9. The method of claim 7, wherein the vehicle door handle is an exterior vehicle door handle, the door lock control zone provided on an exterior facing surface of the exterior door handle.

10. The method of claim 7 further comprising determining a presence of a key fob using a smart key electronic control unit, the smart key electronic control unit communicating the presence of the key fob to the electronic control unit that controls the electric motor.

11. The method of claim 7, wherein the door lock control zone is a first door lock control zone and the vehicle door handle is an interior vehicle door handle, the first door lock control zone provided on an inner facing surface of the interior vehicle door handle, the vehicle further comprising a second door lock control zone and an exterior vehicle door handle, the second door lock control zone provided on an exterior facing surface of the exterior vehicle door handle.

12. A method of controlling a door lock apparatus of a vehicle door, the method comprising:
    determining that a touch sensor is actuated by an operator touch using an electronic control unit, the touch sensor being located in a door lock control zone that is provided on a vehicle door handle of the vehicle door;
    determining that the touch sensor within the door lock control zone is actuated by another operator touch within a predetermined time period using the electronic control unit;
    determining that the touch sensor is actuated by the operator touch using the electronic control unit for less than the predetermined time period corresponding to a first tap;
    determining that the touch sensor is actuated by another operator touch for less than the predetermined time period using the electronic control unit corresponding to a second tap; and
    the ECU controlling an electric motor operatively connected to the door lock apparatus based on determining that the touch sensor within the door lock control zone is actuated by the operator touch for less than the predetermined time period corresponding to the first tap and the second tap and determining that the first tap and the second tap each occur within the predetermined time period.

13. The method of claim 12, wherein the vehicle door handle is an interior vehicle door handle, the door lock control zone provided on an inner facing surface of the interior vehicle door handle.

14. The method of claim 12, wherein the vehicle door handle is an exterior vehicle door handle, the door lock control zone provided on an exterior facing surface of the exterior door handle.

15. The method of claim 12 further comprising determining a presence of a key fob using a smart key electronic control unit, the smart key electronic control unit communicating the presence of the key fob to the electronic control unit that controls the electric motor.

16. The method of claim 12, wherein the door lock control zone is a first door lock control zone and the vehicle door handle is an interior vehicle door handle, the first door lock control zone provided on an inner facing surface of the interior vehicle door handle, the vehicle further comprising a second door lock control zone and an exterior vehicle door handle, the second door lock control zone provided on an exterior facing surface of the exterior vehicle door handle.

17. The method of claim 12, wherein the door lock control zone is formed using a capacitive touch sensor.

* * * * *